June 23, 1970  R. H. WISWALL, JR., ET AL  3,516,263
METHOD OF STORING HYDROGEN
Filed March 25, 1969
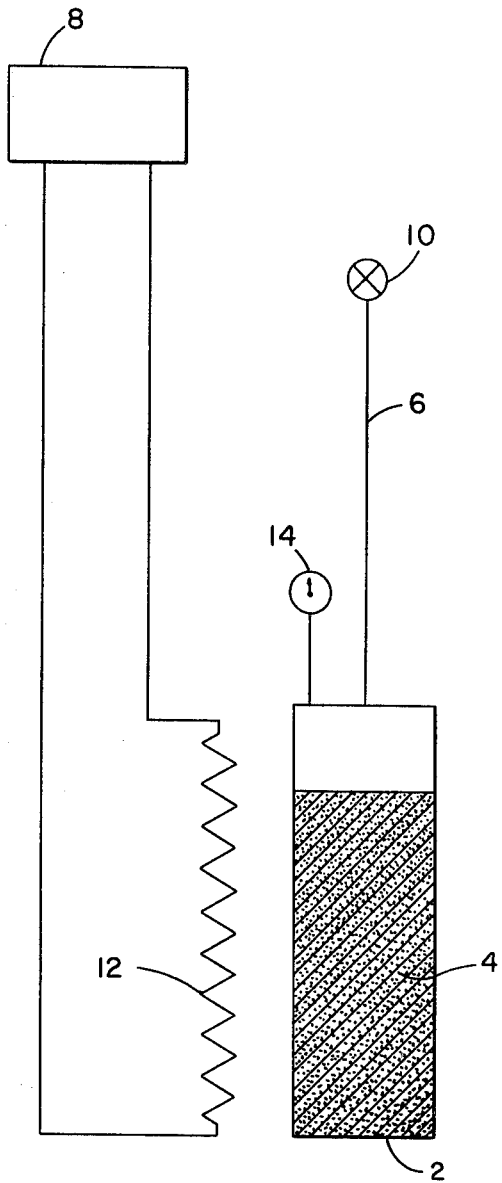
INVENTORS.
RICHARD H. WISWALL, JR.
JAMES J. REILLY JR.

United States Patent Office 3,516,263
Patented June 23, 1970

3,516,263
METHOD OF STORING HYDROGEN
Richard H. Wiswall, Jr., Brookhaven, and James J. Reilly, Jr., Bellport, N.Y., assignors to the United States of America as represented by the United States Atomic Energy Commission
Continuation-in-part of application Ser. No. 710,663, Mar. 5, 1968. This application Mar. 25, 1969, Ser. No. 810,281
Int. Cl. F17c 11/00
U.S. Cl. 62—48
3 Claims

ABSTRACT OF THE DISCLOSURE

A method for storing hydrogen whereby gaseous hydrogen is adsorbed by titanium-iron alloys at temperatures above 10° C. and pressures above 14 pounds per square inch including an apparatus whereby ultra-high purity and high pressure source of hydrogen is obtained upon heating the hydrided alloys in a pressure vessel.

CROSS-REFERENCE TO RELATED APPLICATION

This application is a continuation-in-part of U.S. patent application Ser. No. 710,663, R. H. Wiswall and J. J. Reilly, Jr., entitled "Improved Method of Storing Hydrogen," filed Mar. 5, 1968.

PRIOR ART

Hydrogen is conventionally stored in pressure vessels which are dangerous both from fire and explosion hazards. Others in the art have tried to form stable metal hydrides in order to eliminate the hazards arising from containment of hydrogen in pressurized containers. The metals and alloys previously employed by those skilled in the art have been too expensive to allow their widespread use in conventional processes such as rockets and fuel cells. Purification of hydrogen by conventional methods is costly. The art has long sought a high pressure source of ultra high pressure hydrogen.

In U.S. Pat. No. 3,315,479, R. H. Wiswall, Jr., and J. J. Reilly, Jr., issued Apr. 25, 1967, disclosed a method of storing hydrogen whereby gaseous hydrogen is adsorbed by nickel-magnesium alloys at temperatures above 250° C. and pressures above 18 pounds per square inch. The hydrogen loaded alloys disclosed in U.S. Pat. No. 3,315,479, when heated to temperatures of 250° C. give off hydrogen at a pressure of slightly over one atmosphere.

U.S. Pat. No. 3,375,676, James J. Reilly and Richard H. Wiswall, Jr., entitled "Method of Storing Hydrogen," disclosed a method of storing hydrogen whereby gaseous hydrogen is adsorbed by copper-magnesium alloys at temperatures above 250° C. and pressures above 30 pounds per square inch. The hydrogen loaded alloys disclosed in U.S. Pat. No. 3,375,676 when heated to temperatures of 200° C. give off hydrogen at a constant pressure.

It is an object of this invention to provide those skilled in the art with a simple, economical, safe method of storing hydrogen.

SUMMARY OF THE INVENTION

The invention described herein was made in the course of, or under a contract with the U.S. Atomic Energy Commission.

A novel method for storing hydrogen by forming a hydrogen metal alloy complex, wherein hydrogen gas is absorbed into a metal alloy, comprising contacting gaseous hydrogen with a solid titanium-iron alloy, said alloy containing from about 35 weight percent to about 75 weight percent titanium based upon the total weight of the titanium-iron alloy and from about 25 weight to about 65 weight percent iron based upon the total weight of the titanium-iron alloy, while maintaining said hydrogen and said alloy at a pressure of at least about 14 pounds per square inch and at a temperature of at least about 10° C. until said alloy has absorbed up to about 3 weight percent hydrogen based upon the total weight of the titanium-iron alloy.

We have further discovered a novel apparatus for producing ultra high pressure hydrogen comprising a pressure vessel containing a titanium-iron alloy, said alloy being composed of from about 35 weight percent to about 75 weight percent titanium based on the total weight of the titanium-iron alloy and from about 25 weight percent to about 65 weight percent iron based on the total weight of the titanium-iron alloy having hydrogen entrained in said alloy, heating means operably connected to said alloy and temperature control means operably connected to said heating means. In the preferred embodiment of our invention, we use a titanium-iron alloy containing 68 weight percent titanium and 32 weight percent iron having entrained therein from about 1.7 to about 2.0 atoms of hydrogen per atom of metal contained in the alloy.

BRIEF DESCRIPTION OF THE DRAWING

The figure shows a block diagram of an apparatus constructed in accordance with our application.

DETAILED DESCRIPTION OF THE INVENTION

The figure shows a block diagram of an apparatus constructed in accordance with our invention wherein a pressure vessel 2 containing powdered titanium-iron alloy 4 having hydrogen entrained therein is operably connected to an electrically operated heating coil 12 capable of heating the alloy 4, the temperature of coil 12 being capable of regulation by temperature control means 8, upon heating of the alloy the hydrogen can be removed from the pressure vessel 2 through a gas line 16 and valve 10. Also shown in the figure is a pressure gauge 14 operably connected to the vessel and which gauge 14 can be operably connected to the temperature control means 8, so that the temperature control means can be responsive to the pressure in vessel 2.

The amount of hydrogen that can be absorbed by our novel complex is roughly directly proportional to the amount of titanium contained in the alloy. The rate of adsorption of the hydrogen onto our novel complex is rapid when low temperatures (about 25° C.) and pressures of about 400 p.s.i. are employed in the loading operation. When higher temperatures are employed during the loading operation, of course higher pressures will be required.

The product formed by our method is a hydrogen-titanium-iron complex, whose exact physical and chemical structure is not known at this time.

The hydrogen-titanium-iron complexes produced by the practice of our invention are capable of emitting hydrogen at a pressure of about 3 atmospheres at ambient temperatures (20° C.). They can be readily stored by forming the complex in accordance with the method disclosed by our invention and maintaining the complex in a pressure vessel. A more rapid release of the hydrogen can be effectuated by applying heat to the complex. To release the hydrogen from the complex, all that is required to be done is to allow the hydrogen to escape from the vessel in which it is contained.

A unique feature of our novel complexes is the fact that hydrogen is released at a constant rate from a complex when the complex is maintained at a specific temperature of 25° C. until the complex contains less than 1.0 weight percent of hydrogen based on the total weight of titanium-iron alloy contained in the complex. For example, a hydrogen titanium-iron complex containing 2 weight percent hydrogen based upon the weight of the titanium-iron alloy upon being heated at a constant temperature of 25° C. will maintain a hydrogen pressure of >15 lbs. per square inch above the alloy until about 1.0 weight percent of hydrogen remains in the complex. This feature provides those skilled in the art with a simple hydrogen source in which the rate of release can be carefully controlled by simply controlling the temperature of the complex during the release. Thus, it will be apparent to those skilled in the art that our invention can be readily adapted to conventional techniques to provide a safe dependable source of hydrogen for a multiude of uses such as rockets, fuel cells, etc.

Further, as will be readily apparent to those skilled in the art, the novel hydrogen-titanium-iron complexes disclosed herein can be readily used as a source of energy available at temperatures above 10° C. to provide required heat source to enable the hydrogen-alloy complexes disclosed in U.S. Pat. No. 3,315,479 and U.S. Pat. No. 3,375,676, to give off the hydrogen entrained therein. Thus small amounts of hydrogen can be contained in the instant alloys in a relatively small pressure vessel which can provide a means to release large amounts of hydrogen from large quantities of other hydrogen alloy complexes which latter complexes do not require pressure vessel containment at low temperatures. This advantage will greatly enhance the safety factors when such storage systems are employed in fuel cells and rockets as fuel depots.

In the preferred embodiment of our invention, the titanium-iron alloy contains 62 weight percent titanium and 38 weight percent iron based on the total weight of the alloy. The alloys found usable in our invention can be produced by any convenient alloying technique. They can be produced by simply heating the proper amounts of titanium and iron under an inert atmosphere with an induction heater until a melt is formed, intimately mixing the ingredients of the melt and thereafter cooling the melt until a solid alloy is formed. Liquid metal alloys are not desirable for use in the practice of our invention because the pressure requirements required to form the desired hydrogen-alloy complex would be too great. Our invention is not limited to any particular physical shape of the alloy, blocks, and meshes of the alloy can be employed and indeed in certain applications, such shapes may be desirable. In practice when hydrogen is adsorbed onto solid blocks of titanium-nickel alloys and desorbed therefrom, the solid block disintegrates into a pulverulent form. Conventional pressure vessels and heating devices may be employed in the practice of our invention.

In the preferred embodiment of our invention, the hydrogen and the titanium-iron alloy are maintained at a temperature of 20° C. and maintained under a pressure of 200 pounds per square inch absolute during the loading operation. The pressure can be maintained by adding additional increments of hydrogen to the system to counterbalance the increments taken up by the alloy during the absorption phase of the process.

We have found that about 4 atoms of hydrogen will be adsorbed per atom of metal contained in an alloy containing minimal amounts of iron. One mol of an alloy having the composition corresponding to $Ti_2Fe$ will absorb up to 2 mols of hydrogen during the practice of our invention.

EXAMPLE I

*Apparatus.*—An upright reactor vessel consisting of a stainless steel tube flanged on the top end, and having an inside diameter of one inch, and a length of about 4.0 inches, was fitted with a thermocouple well in the bottom end of the vessel. The bottom end of the vessel was sealed and a connection was fitted to the top of the vessel to permit gas to be withdrawn and introduced in the vessel. The vessel was inserted into an electrically heated furnace. Samples were placed in the vessel.

*Procedure.*—A 6 gm. sample of an alloy consisting of 68 by weight Ti and 32 by weight Fe was weighed out in a dry box. The sample was pulverized so that it could go through a 25 mesh screen (U.S. Standard Sieve Series), be reweighed and introduced into the vessel. The sample was immersed in acetone so that it was not exposed to air as the vessel was removed from the dry box and introduced into the heater. The vessel was sealed, evacuated and the sample heated in-vacuo for about two hours at a temperature of 350° C. and allowed to cool to 20° C. $H_2$ was admitted to the vessel until a pressure of 400 p.s.i.a. was reached. Approximately 80 percent of the $H_2$ ultimately absorbed was absorbed in 3–4 minutes. When absorption was essentially complete, the reactor was at room temperature and gaseous $H_2$ was vented from the system until a predetermined pressure of 14 p.s.i.a. was reached. The sample was heated to about 40° C. and allowed to come to equilibrium and the pressure recorded. At equilibrium, some gaseous $H_2$ was removed from the system after which a new equilibrium was reached. When no further $H_2$ evolved from the sample upon removing gaseous $H_2$, the entire cycle was repeated by re-admitting $H_2$ into the system and re-absorbing $H_2$ in the alloy.

*Results.*—A hydrogen content of about 2 weight percent has been repeatedly obtained by absorption in an alloy with the starting composition of 68 weight percent Ti, 38 weight percent Fe. The fact that the sorption-desorption cycle can be repeated indefinitely is of practical significance as it allows for economic use of the alloys to effectuate $H_2$ storage. Samples of hydrided alloys lost hydrogen upon exposure to the atmosphere.

EXAMPLE II

*Apparatus.*—A block diagram of a high pressure $H_2$ storage reservoir containing iron-titanium hydride used in our example is shown in the attached figure. It is fitted with a thermocouple well, pressure gauge and valve through which $H_2$ may be introduced or withdrawn.

*Procedure.*—The reservoir was filled with 57 g. of powdered FeTi and sealed. The reservoir was then attached to an experimental manifold through which high pressure $H_2$ or He could be supplied. In addition the manifold was connected to high vacuum system by which gases could be exhausted from said manifold and reservoir. Heat was supplied to the reservoir as needed by an electric clam shell heater.

The reservoir was heated under a dynamic vacuum to a temperature of ~400° C. at which point the reservoir was air cooled to room temperature. Hydrogen was introduced into the system and maintained at a pressure of ~500 p.s.i.a. for several hours. The hydride formed during this period was then decomposed by reducing the $H_2$ pressure by venting to the room, then applying a dynamic vacuum to the system and heating to 400° C. This cycle of sorption-desorption was repeated several times in order to "activate" the solid. Finally, the activated solid was exposed to $H_2$ at 500 p.s.i.a. for ~6 hours and then cooled and held overnight at −78° C. while maintaining the $H_2$ presure at 500 p.s.i.a. The reservoir was warmed to room temperature and removed from the manifold. At this point the $H_2$ pressure in the reservoir was 500 p.s.i.a and the composition of the solid approaching $FiTiH_2$.

*Results.*—The reservoir was heated and a series of pressure readings were taken at several temperatures which are shown below:

| Temp. ° C.: | Measured pressure p.s.i.a. |
|---|---|
| 20 | 515 |
| 50 | 1160 |
| 75 | 1650 |
| 98 | 2500 |
| 137 | 3725 |

It should be noted that in the composition range $$FeTiH_{1.0} - FeTiH_{2.0}$$

the dissociation pressure is dependent on both the temperature and the solid composition. Shown below is the table in which theoretical dissociation pressures were calculated based on the particular solid compositions at the temperatures indicated.

| Temp., ° C. | Calculated Pressure, p.s.i.a | | |
|---|---|---|---|
| | $FeTiH_{1.3}$ | $FeTiH_{1.5}$ | $FeTiH_{1.7}$ |
| 20 | 78 | 97 | 125 |
| 50 | 308 | 433 | 559 |
| 75 | | 711 | |
| 98 | | 1,373 | |
| 137 | | 3,539 | |

It is apparent from these data that initially the hydride composition was $FeTih > 1.7$ which as the decomposition proceeded approached $FeTiH_{1.5}$.

Following the above experiment some $H_2$ was vented from the reservoir so the hydride composition approximated $FeTiH_{1.0}$. The reservoir was cooled and then reheated. A further series of pressure-temperature readings were taken which are shown below and which are also compared with calculated values.

| Temp., ° C. | Measured Pressure, p.s.i.a. | Calculated Pressure $FeTiH_{0.1-1.0}$ |
|---|---|---|
| 102 | 465 | 446 |
| 148 | 1,005 | 1,000 |
| 195 | 1,915 | 1,936 |
| 208 | 2,165 | 2,272 |

Since in the composition range $FeTiH_{0.1-1.0}$ the dissociation pressure is not composition dependent, $H_2$ could be, and was, removed from the reservoir with no substantial change in the dissociation pressure until the hydride was almost completely decomposed.

Our novel apparatus is capable of producing hydrogen having a purity of better than 99.99%. In addition to producing ultra high pure hydrogen, our novel apparatus is capable of generating hydrogen gas pressures of better than 10,000 p.s.i. when the alloy in the vessel is heated to relatively modest temperatures of about 200° C.

We claim:

1. An apparatus for producing ultra pure high pressure hydrogen comprising:
    (a) a pressure vessel containing titanium-iron alloy having hydrogen entrained in said alloy;
    (b) heating means operably connected to said alloy;
    (c) temperature control means operably connected to said heating means.

2. An apparatus in accordance with claim 1 wherein there is entrained from between about 1.7 to about 2.0 atoms of hydrogen per atom of metal in said alloy.

3. An apparatus in accordance with claim 1 wherein the alloy contains 68 weight percent titanium and 32 weight percent iron based on the total weight of the alloy.

References Cited

UNITED STATES PATENTS

| 1,901,446 | 3/1933 | Heylandt | 62—48 |
| 1,961,890 | 6/1934 | Miller et al. | 62—48 |
| 2,508,271 | 5/1950 | Krchma | 23—293 |
| 2,663,626 | 12/1953 | Spangler | 62—48 |
| 2,882,244 | 4/1959 | Milton | 62—48 |
| 3,300,992 | 1/1967 | Hager et al. | 62—48 |
| 3,309,844 | 3/1967 | Hemstreet et al. | 62—55.5 |
| 3,315,479 | 4/1967 | Wiswall et al. | 62—48 |

LLOYD L. KING, Primary Examiner